P. Herbert,
Wheel Plow.
No. 93,618.          Patented Aug. 10, 1869.
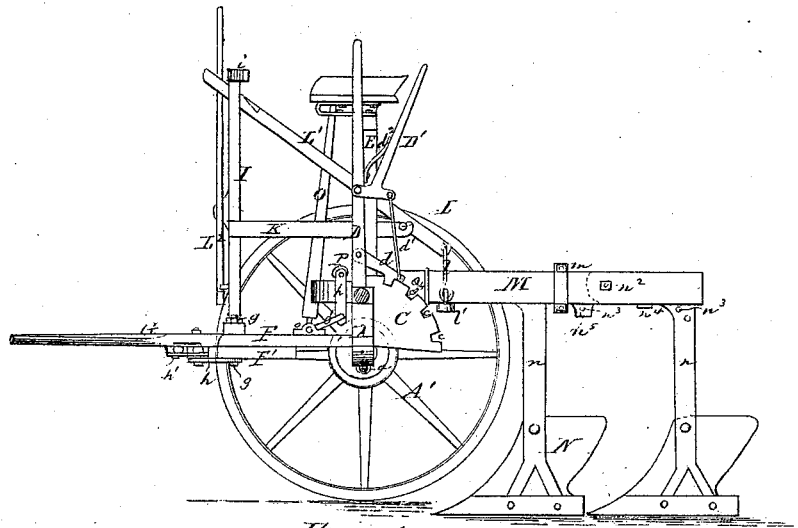
Figure 1.
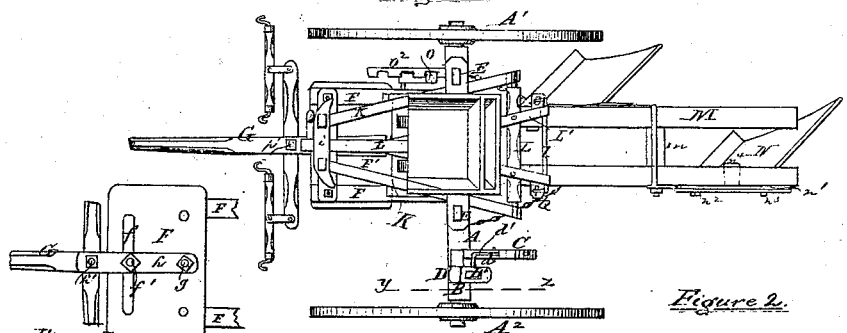
Figure 5.          Figure 2.
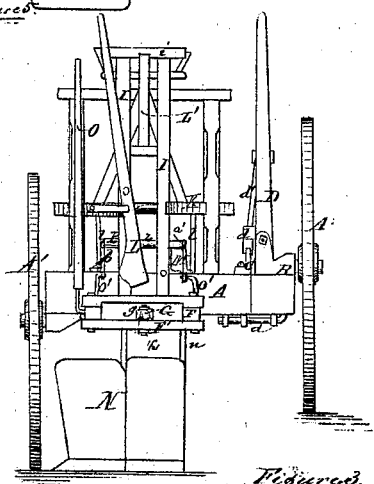 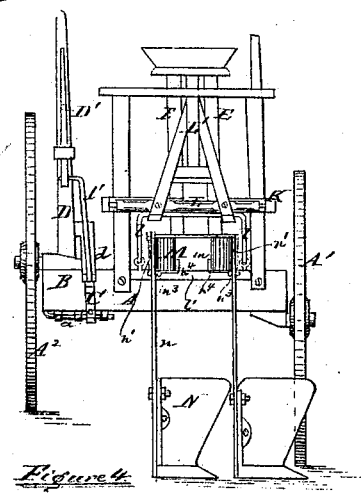
Figure 3.          Figure 4.
Witnesses.          Inventor:

UNITED STATES PATENT OFFICE.

PHILIPP HERBERT, OF ST. LOUIS, MISSOURI.

IMPROVEMENT IN GANG-PLOWS.

Specification forming part of Letters Patent No. 93,618, dated August 10, 1869.

*To all whom it may concern:*

Be it known that I, PHILIPP HERBERT, of St. Louis, in the county of St. Louis and State of Missouri, have made certain new and useful Improvements in Gang-Plows; and I do hereby declare that the following is a full and clear description thereof, reference being had to the accompanying drawings, and to the letters of reference marked thereon.

The nature of this invention is in the manner of connecting the wheel to the axle of the plow, in the method of raising the plows and gaging the depth thereof, and supporting the plow-beams, and in the arrangement of draft-pole for adjusting the direction of the draft to the cutting of the plow, all of which will hereinafter more fully appear.

To enable those herein skilled to make and use my said improvements, I will now fully describe the same, referring to Figure 1 as a sectional side view at line $y\,z$ of plan; to Fig. 2 as a plan; to Fig. 3 as a front view; and to Fig. 4 as a rear view, showing the arrangement of my said plow in its usual construction. Fig. 5 is a part bottom view of the tongue attachment.

I support the axle A upon the wheel A' on the one side in the manner usual in ordinary vehicles. On the other side I support the said axle on the wheel $A^2$ in an adjustable manner as to height, as follows: To the under side of the axle A, I secure by eyebolts or staples the axle-bar $a$, usually of wrought-iron. On said bar will be clamped the wooden tree-journal B, on which the wheel $A^2$ is arranged in the ordinary manner. The end of the axle A has an indented sector, C, thereon. Into the indentations $c$ thereof the pawl $d$ engages, said pawl being connected with a lever, D, and operated by a hand-rod, D', and link $d'$. A spring, $d^2$, keeps the rod D' in such position that the pawl remains in engagement on the sector C unless operated by hand. If, therefore, the pawl is raised, the operator, by using the lever D to turn the tree-journal B, may regulate the position of the axle of the wheel $A^2$ to the axle A, and in this way bring the axle A into proper height and gage the depth of the plows in ground.

On the axle A, I arrange the posts E, supporting the seat of the driver, and under said axle I secure thereto the tongue-pieces F, which at their forward ends carry the front board F', to which the pole G is attached, being hinged thereto at the pivot-bolt $g$. In order to incline the pole G from a line perpendicular to the axle A, and thereby cause the draft-team to pull the plows toward or from the land into which they are cutting, I arrange the slot $f$ in the front board, F', and regulate the position of the pole G by set-screw or bolt $g'$ in said slot. Said set-screw $g'$ affords also a point of attachment for the link $h$, which supports the swivel-bolt $h'$ of the double-tree H, the pole G acting with the link $h$ to support said bolt $h'$. On said tongue-pieces F, I support the standards I, having a cross-bar, $i$. Said standards support one end of the fulcrum-pieces K, these being further supported on the posts E. At the rear ends of the pieces K they are notched for a journal-seat for the pivot-bar L, on which the forked lever L' vibrates. Said lever is limited in its upstroke by the cross-bar $i$, and at its rear end supports, by hinged hanger-rods $l$, the plow-beams M. The plow-beams extend forward to a rest on the axle A, and are laterally guided by guide-plates, Fig. 3, which are secured in the axle. When the plow-beams are to be raised to throw the plows out of ground, the operator, by his foot, depresses the lever L' and brings its forward end under the detainer-bar $L^2$, which is hinged to one of the standards I, and then holds down the lever L'. The plow-beams M form a frame of two parallel pieces joined by transverse slots $m$, and secured relatively to each other by proper bolts or stirrup-clamps generally, as indicated in Figs. 1, 2, and 4. At their rear ends these beams support the standards $n$ of the plows N. The standards $n$ have horizontal arms $n'$, pivoted in the beams M at proper pivot-bolts, $n^2$, and wooden pins $n^3$ prevent the plows from rising up. At the same time a suitable strap-plate, $n^4$, passing under the arms $n'$ prevents the plow from dropping down. In case of a jam or other impediment in the movement of the plow, the wooden pin $n^3$ will break, and the plows may then lift out of ground, (turning on the pivot $n^2$,) and thus avert serious injury. It may be advantageous to form an arm, $n^5$, as an extension of the arm $n'$, into which the holes for the pin $n^3$ may be made, and thus the plow-standards $n$ will not be weakened.

When the plows run in ground too deeply, I raise the forward end of the plow-beam M, thereby tilting the plows and raising the point of the plowshare and relieving it of draft in the manner following: The lever O connects with the crank O', which vibrates in journals o on the tongue-pieces F. When said lever is moved forward, the crank O' approaches a vertical position, and raises the front end of the plow-beams M, as required. A rack, $O^2$, is used to hold the lever O in the position required. When the plows are raised out of ground by the lever L', owing to the attachment thereof at the rear of the beams M, these will incline to tip up, their forward ends rising off from the axle A. To prevent this the roller P is linked by straps $p$ to the crank O', and thus holds the beams down. The plow-beams M are connected by chains Q with the axle. Said chains attach to hooks on the beams M, and may be readily detached. In order, furthermore, to facilitate the detachment of the plows and beams from the axle A and other supporting devices, the hangers $l$ connect by hooks to a cross-bar, $l'$, passing under the plow-beams. By detaching the hangers $l$ from this cross-bar $l'$ the beams M may then be disconnected.

Having thus fully described my said invention, what I claim is—

1. The axle-bar $a$, tree-journal B, and sector and pawl devices for connecting the wheel $A^2$ with the axle A, substantially as set forth.

2. The front board, F', pivot $g$, link $h$, and pole G, connected adjustably by the slot $f$ and set-screws $f'$, substantially as set forth.

3. The standard I, lever L', bar $L^2$, fulcrum K, links $l$, and cross-bar $l'$, arranged in combination with the plow-beams M, substantially as set forth.

4. The lever O, crank O', link $p$, and roller P, supporting and operating the front end of the beams M, substantially as constructed and arranged.

5. The plows N, standards $n$, pins $n^3$, arms $n'$, and pivot $n^2$, when operating substantially as set forth.

In witness of said invention I have hereunto set my hand.

PHILIPP HERBERT.

Witnesses:
GEO. P. HERTHEL, Jr.,
WILLIAM W. HERTHEL.